(12) United States Patent
Hellman et al.

(10) Patent No.: US 9,014,428 B2
(45) Date of Patent: Apr. 21, 2015

(54) OBJECT DETECTION USING DIFFERENCE OF IMAGE FRAMES

(71) Applicant: Sony Mobile Communications AB, Lund (SE)

(72) Inventors: Erik Hellman, Malmo (SE); Erik Westenius, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 100 days.

(21) Appl. No.: 13/768,004

(22) Filed: Feb. 15, 2013

(65) Prior Publication Data
US 2014/0233787 A1  Aug. 21, 2014

(51) Int. Cl.
*G06K 9/00* (2006.01)
*G06K 9/32* (2006.01)

(52) U.S. Cl.
CPC .......... *G06K 9/3241* (2013.01); *G06K 9/00355* (2013.01); *G06K 9/00744* (2013.01)

(58) Field of Classification Search
None
See application file for complete search history.

(56) References Cited

U.S. PATENT DOCUMENTS

| | | | |
|---|---|---|---|
| 8,538,191 B2 * | 9/2013 | Kim et al. | 382/274 |
| 8,717,318 B2 * | 5/2014 | Anderson et al. | 345/173 |
| 8,718,837 B2 * | 5/2014 | Wang et al. | 701/2 |
| 2008/0219503 A1 * | 9/2008 | Di Venuto et al. | 382/103 |
| 2009/0010493 A1 * | 1/2009 | Gornick et al. | 382/103 |
| 2011/0193778 A1 * | 8/2011 | Lee et al. | 345/158 |
| 2013/0273968 A1 * | 10/2013 | Rhoads et al. | 455/556.1 |

OTHER PUBLICATIONS

U.S. Search Report and Written Opinion for corresponding International Application No. PCT/IB2014/058786 dated May 21, 2014.
Thomas B. Moeslund: "Introduction to Video and Image Processing", 2012, Springer, XP055117265, p. 1-4, 117-127.
Chung-Lin Huang et al: "A model-based hand gesture recognition system", Machine Vision and Applications, vol. 12, No. 5, Mar. 2001, pp. 243-258, XP55102270, ISSN: 0932-8092, DOI: 10.1007/s001380050144.

* cited by examiner

*Primary Examiner* — Nancy Bitar
(74) *Attorney, Agent, or Firm* — Renner, Otto, Boisselle & Skylar, LLP.

(57) ABSTRACT

Object detection using a difference between image frames may include receiving a first image of a field of view, receiving a second image of the field of view, determining a difference between portions of the first image and corresponding portions of the second image, and declaring based on the difference between the portions of the first image and the corresponding portions of the second image that a specific object has been detected in the field of view.

17 Claims, 5 Drawing Sheets

OBJECT DETECTION USING DIFFERENCE OF IMAGE FRAMES

TECHNICAL FIELD OF THE INVENTION

The technology of the present disclosure relates generally to computational vision and portable electronic devices, and more particularly to systems and methods for object detection using difference of image frames.

DESCRIPTION OF THE RELATED ART

Object detection has conventionally involved complex processes that require devices performing the object detection to be equipped with relatively large amounts of memory and processing power in order to achieve acceptable levels of accuracy.

Mobile electronic devices such as mobile telephones and smartphones, tablet computers, cellular-connected laptop computers, and similar devices are ever increasing in popularity. Specifications for mobile electronic devices including specifications for memory and processing power seem to be continuously increasing. However, at least in part due to their mobile nature, memory and processing power of mobile devices will always tend to be relatively limited, particularly when compared to their non-mobile counterparts. These limitations have conventionally made mobile electronic devices less than ideal candidates to perform accurate object detection.

SUMMARY

The concept of the systems and methods disclosed herein includes simplified object detection processes. These simplified object detection processes demand relatively lower memory and processing power requirements, which may allow relatively efficient and accurate object detection by mobile devices.

In one aspect of the invention, an image capturing device for object detection includes a camera configured to obtain data representing a first image and a second image of objects in a field of view of the camera, and an object detector. The object detector includes a difference calculator configured to receive the data representing the first image and the second image and determine a difference between portions of the first image and corresponding portions of the second image, and a classifier configured to declare, based on the difference between the portions of the first image and the corresponding portions of the second image, that a specific object has been detected in the field of view of the camera.

In one embodiment, the difference calculator is configured to generate a difference image by performing a portion to portion comparison of the portions of the first image and the corresponding portions of the second image, the difference image includes portions corresponding to the difference between the portions of the first image and the corresponding portions of the second image as determined by the comparison of the portions of the first image and the corresponding portions of the second image, and the portions of the difference image are binarily set or unset based on a comparison of the difference between the portions of the first image and the corresponding portions of the second image and a threshold.

In another embodiment, the difference calculator is configured to perform a pixel by pixel comparison of pixels of the first image and corresponding pixels of the second image to determine difference between the pixels of the first image and the corresponding pixels of the second image.

In yet another embodiment, the difference calculator is configured to generate a difference image whose pixels correspond to the difference between the pixels of the first image and the corresponding pixels of the second image.

In one embodiment, the difference calculator is configured to binarily declare pixels of the difference image set or unset based on a comparison of the difference between the pixels of the first image and the corresponding pixels of the second image and a threshold.

In another embodiment, the image capturing device includes a data store including data corresponding to sample features of objects including features of the specific object. In this embodiment, the classifier is configured to compare features in the difference image to the sample features to declare that the specific object has been detected in the field of view of the camera.

In yet another embodiment, the classifier is configured to perform an optical character recognition (OCR) of the difference image to recognize a pattern in the difference image corresponding to the specific object.

In one embodiment, the classifier is configured to declare based on a relatively large difference between the portions of the first image and the corresponding portions of the second image that movement of the object has been detected.

In another aspect of the invention, a method for object detection includes receiving a first image of a field of view, receiving a second image of the field of view, determining difference between portions of the first image and corresponding portions of the second image, and declaring based on the difference between the portions of the first image and the corresponding portions of the second image that a specific object has been detected in the field of view.

In one embodiment, the determining the difference between the portions of the first image and the corresponding portions of the second image includes performing a pixel by pixel comparison of pixels of the first image and corresponding pixels of the second image to determine difference between the pixels of the first image and the corresponding pixels of the second image.

In another embodiment, the determining the difference between the portions of the first image and the corresponding portions of the second image includes generating a difference image whose pixels correspond to the difference between the pixels of the first image and the corresponding pixels of the second image.

In yet another embodiment, the determining the difference between the portions of the first image and the corresponding portions of the second image includes binarily declaring pixels of the difference image set or unset based on a comparison of the difference between the pixels of the first image and the corresponding pixels of the second image and a threshold.

In one embodiment, the declaring based on the difference between the portions of the first image and the corresponding portions of the second image that the specific object has been detected includes comparing features in the difference image to predetermined sample features of objects.

In another embodiment, the declaring based on the difference between the portions of the first image and the corresponding portions of the second image that the specific object has been detected includes performing an optical character recognition (OCR) of the difference image to recognize a pattern in the difference image corresponding to the specific object.

In yet another embodiment, the declaring based on the difference between the portions of the first image and the corresponding portions of the second image that the object has been detected in the field of view includes declaring based on a relatively large difference between the portions of the first image and the corresponding portions of the second image that movement has been detected.

In one embodiment, the declaring based on the relatively large difference between the portions of the first image and the corresponding portions of the second image that movement of has been detected includes comparing features in the difference image to predetermined sample features of objects to identify features in the difference image corresponding to specific movements or gestures.

In another embodiment, the determining the difference between the portions of the first image and the corresponding portions of the second image include generating a difference image by performing a portion to portion comparison of the portions of the first image and the corresponding portions of the second image, wherein the difference image includes portions corresponding to the difference between the portions of the first image and the corresponding portions of the second image as determined by the comparison of the portions of the first image and the corresponding portions of the second image, and wherein the portions of the difference image are binarily set or unset based on a comparison of the difference between the portions of the first image and the corresponding portions of the second image and a threshold.

In yet another aspect of the invention, an object detector includes a processor, a data store operatively connected to the processor and including data representing a first image and a second image of a field of view, a difference calculator configured to receive the data representing the first image and the second image and determine difference between portions of the first image and corresponding portions of the second image, and a classifier configured to declare, based on the difference between the portions of the first image and the corresponding portions of the second image, that a specific object has been detected in the field of view.

In one embodiment, the difference calculator is configured to generate a difference image by performing a portion to portion comparison of the portions of the first image and the corresponding portions of the second image, the difference image includes portions corresponding to the difference between the portions of the first image and the corresponding portions of the second image as determined by the comparison of the portions of the first image and the corresponding portions of the second image, and the portions of the difference image are binarily set or unset based on a comparison of the difference between the portions of the first image and the corresponding portions of the second image and a threshold.

In another embodiment, the difference calculator is configured to perform a pixel by pixel comparison of pixels of the first image and corresponding pixels of the second image to determine difference between the pixels of the first image and the corresponding pixels of the second image and binarily declaring pixels of a difference image set or unset based on a comparison of the difference between the pixels of the first image and the corresponding pixels of the second image and a threshold, and the classifier is configured to compare features in the difference image to predetermined sample features to declare that the specific object has been detected in the field of view.

In yet another embodiment, the classifier is configured to declare based on a relatively large difference between the portions of the first image and the corresponding portions of the second image at least one of movement has been detected in the field of view, or a specific movement or gesture has been detected in the field of view.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Embodiments of the present invention will now be described with reference to the drawings, wherein like reference numerals are used to refer to like elements throughout. It will be understood that the figures are not necessarily to scale.

Figure 1A:
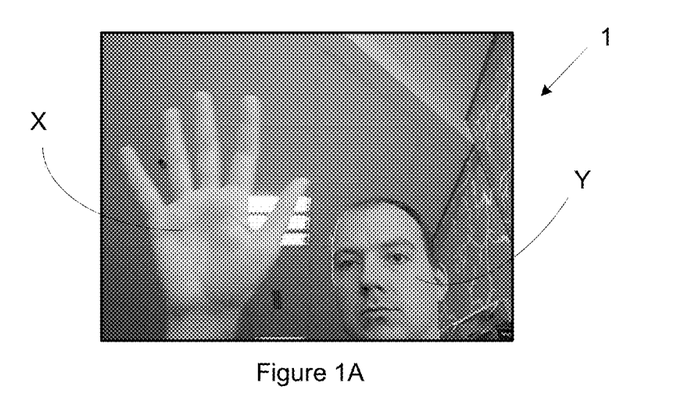
FIGS. 1A and 1B illustrate exemplary image frames of a field of view.
Figure 1B:
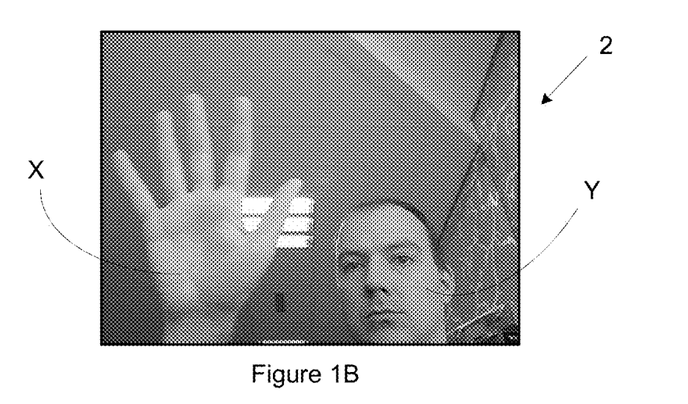

FIGS. 1A and 1B illustrate exemplary images of a field of view. In the illustrated embodiment, the images 1 and 2 are consecutive frames that were obtained using a camera. Such consecutive frames of the same field of view may be obtained by securing the camera in a stationary position such as by mounting the camera on a base or tripod. Such consecutive frames of the same field of view may also be obtained, even without securing the camera in a stationary position, by obtaining the image frames within a relatively short period of time such that the period of time between pictures is relatively small or non-existent relative to any movement of the camera or any objects in the field of view of the camera.

Figure 1C:
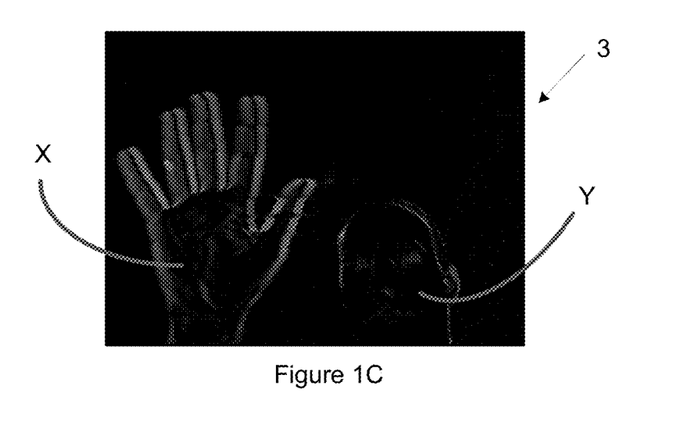
FIG. 1C illustrates an exemplary image generated by calculating the absolute difference between the frames of FIGS. 1A and 1B.

FIG. 1C illustrates an exemplary image 3 that was generated by calculating the absolute difference between the two frames of images 1 and 2. Thus, the formula for generating the image 3 may be expressed as:

$$\text{diff}(i) = \text{abs}(\text{frame1}(i) - \text{frame2}(i)) \qquad \text{Eq. 1}$$

The resulting image 3 comprises black (no data containing) pixels where there is no difference between the two frames 1 and 2, and non-black (data containing) pixels where a difference between the two frames 1 and 2 exists. This process results in data that includes the features in the field of view that are different or have moved between the frame 1 and the frame 2 as may be appreciated from image 3. In the example of image 3 the process results in data that includes the outline of the objects in the field of view that moved between the frame 1 and the frame 2.

In the example of FIGS. 1A-1C, images 1 and 2 include a hand X in the field of view. As may be appreciated, the image 3 includes an outline of the hand X as well as other data corresponding to the hand X. Similarly, images 1 and 2 include a person's head Y in the field of view. As may be appreciated, the image 3 includes an outline of the head Y as well as other data corresponding to the hand Y.

In the example of FIGS. 1A-1C, the hand X was voluntarily moving as the frames 1 and 2 were captured and thus it was to a point expected that the image 3 would include data corresponding to the hand H or to the movement of the hand H. However, the head Y was not moving, at least not voluntarily, as the frames 1 and 2 were captured. Nevertheless image 3 includes data corresponding to the head Y. Thus, the systems and methods disclosed herein exploit the tendency of human beings (and other animal beings, etc.) of involuntary movement.

Any data corresponding to the no change or no data containing portions in the image 3 (i.e., the black areas) may be discarded. Thus, the information from image 3 used for object detection includes only a relatively small amount of data including data corresponding to the outlines of objects in the field of view that move between frames 1 and 2. This greatly minimizes the memory and processing power demands required to perform the object detection process.

In one embodiment, the data derived from Eq. 1 may be compared to a threshold. For example, every data point resulting from the calculation involving Eq. 1 may be compared with a threshold that represents the minimum amount of difference necessary for the pixel or data point to be declared non-black (i.e., data containing). Comparing the data derived from Eq. 1 to a threshold in this manner may further reduce the amount of data necessary for object detection and may also reduce signal noise. Comparing the data derived from Eq. 1 to a threshold in this manner may also give sharper outlines or more contrasting data for the features or objects that move between the frames 1 and 2. The resulting image will contain features that are more easily detectable and less sensitive to light conditions in the field of view.

The data derived from Eq. 1 or the data remaining after data derived from Eq. 1 has been compared to a threshold is herein referred to as the difference image, and this difference image may be used to detect specific objects in the field of view.

In one embodiment, the difference image 3 is compared to a collection of images or samples corresponding to features of known objects. Based on that comparison, specific known objects can be detected.

Such collection of features may be derived by performing the processes described herein on the known objects. In this manner, object classifiers may be built. In one example, an object classifier may be built using existing machine learning algorithms (e.g., Haar classifier).

Such classifiers built to identify specific objects detected via the systems and methods disclosed herein would need a relatively smaller collection of images or samples. This is in part because the difference images derived via these systems and methods contain relatively small amounts of data and in some cases, as illustrated in FIG. 1C, contain only or mostly the outlining contours of the features of the objects to be detected. Such classifiers should also require less time for training the classifier as there are fewer samples to process.

In one embodiment, relevant features of objects are detected by finding bounding boxes, for example, around the contours or outlines of the objects in the difference image 3.

In one embodiment, the process of building the collection of images or samples and, thus, the process of training the classifier may be automated in large part because of the efficiency and economy of the disclosed systems and methods of object detection. A resulting classifier trained using the systems and methods disclosed herein will be relative small and substantially smaller than prior art classifiers and would, thus, require less memory and processing power to use.

In one embodiment, relevant features of objects are detected by performing optical character recognition (OCR) of the difference image 3 to recognize a pattern in the difference image 3 corresponding to the specific object to be detected. The nature of the difference image 3 data, which contains relatively small amounts of data including contours or outlines of the objects in the difference image 3, makes specific object detection possible using relatively simple processes such as OCR.

As discussed above, in the example of FIGS. 1A-1C, the hand X was voluntarily moving as the frames 1 and 2 were captured, but the head Y was not. Nevertheless image 3 includes data corresponding to the hand X and the head Y. However, since the hand X was voluntarily moving, larger non-black portions of the difference image 3 correspond to the hand X than to the head Y, which was not voluntarily moving. In one embodiment, this effect may be exploited such that a relatively large difference between the portions of the first image 1 and the corresponding portions of the second image 2 as reflected in the difference image 3 may be declared as detection of movement.

In one embodiment, the difference image 3 is compared to a collection of images or samples corresponding to features of known movements. Based on that comparison, specific known movements may be detected. Such collection of features may be derived by performing the processes described herein on the known movements. In this manner, movement classifiers may be built.

Figure 2:
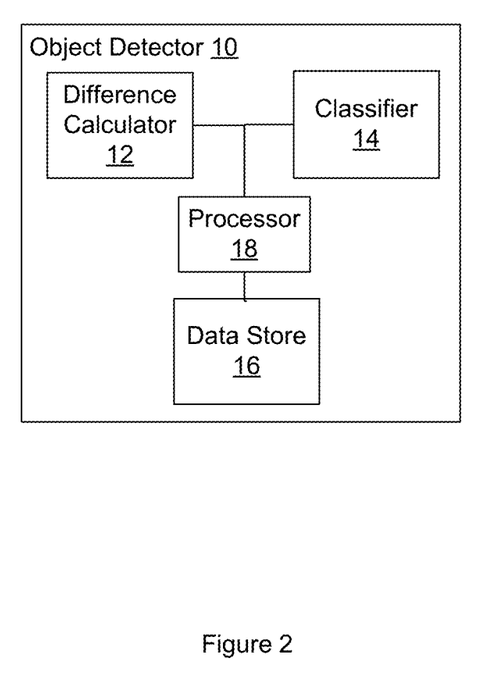
FIG. 2 illustrates an exemplary simplified block diagram of an object detector capable of detecting objects.

FIG. 2 illustrates an exemplary block diagram of an object detector 10 capable of detecting objects according to the principles described above. The object detector 10 includes a difference calculator 12 that receives data representing the first image 1 and the second image 2. Although in the example of FIGS. 1A-1C the first image 1 and the second image 2 are described as consecutive frames, the images 1 and 2 do not necessarily have to be consecutive. Moreover, although in the example of FIGS. 1A-1C two images, the first image 1 and the second image 2, are described, the difference calculator 12 may receive more than two images.

The difference calculator 12 determines the absolute difference between portions of the first image 1 and corresponding portions of the second image 2. In one embodiment, the difference calculator 12 generates the difference image 3 at least in part by performing a portion to portion comparison of the portions of the first image 1 and the corresponding portions of the second image 2. In this embodiment, the difference image 3 includes portions corresponding to the difference between the portions of the first image 1 and the corresponding portions of the second image 2.

In one embodiment, the difference calculator 12 binarily set or unsets (i.e., declares black (not data containing) or non-black (data containing), respectively) the portions of the difference image 3 based on a comparison of a) the difference between the portions of the first image 1 and the corresponding portions of the second image 2 to b) a threshold. For example, every portion of image 3 may be compared with a threshold that represents the minimum amount of difference necessary for the portion to be declared non-black (i.e., data containing). Portions corresponding to differences higher than the threshold may become or remain part of the difference image 3 while portions lower than the threshold may be discarded.

In one embodiment, the difference calculator 12 performs a pixel by pixel comparison of pixels of the first image 1 and corresponding pixels of the second image 2 to determine the difference between the pixels of the first image 1 and the corresponding pixels of the second image 2. In this embodiment, the difference calculator 12 generates a difference image 3 whose pixels correspond to the difference between the pixels of the first image 1 and the corresponding pixels of the second image 2. Further in this embodiment, the difference calculator 12 binarily declares pixels of the difference image 3 set or unset based on a comparison of a) the difference between the pixels of the first image 1 and the corresponding pixels of the second image 2 and b) a threshold.

The object detector 10 also includes a classifier 14 that declares that a specific object has been detected in the field of view. The classifier 14 declares that a specific object has been detected in the field of view based on the difference image 3, which may include image portions corresponding to the differences between the portions of the first image 1 and the corresponding portions of the second image 2 or image portions corresponding to the differences between the portions of the first image 1 and the corresponding portions of the second image 2 that are equal or higher than a threshold.

In one embodiment, the object detector 10 includes a data store 16 that includes data corresponding to sample features of objects as described above. The sample features may include features of specific objects to be detected. In this embodiment, the classifier 14 compares features in the difference image 3 to the sample features and declares that a specific object has been detected in the field of view when a match is found in the sample features. In one embodiment, the classifier 14 performs an optical character recognition (OCR) of the difference image 3 to recognize a pattern in the difference image 3 corresponding to the specific object to be detected.

In one embodiment, the classifier 14 declares that movement of an object has been detected based on relatively large differences in the difference image 3 or between the portions of the first image 1 and the corresponding portions of the second image 2.

The object detector 10 further includes a processor 18 operatively connected to the difference calculator 12, the classifier 14, and the data store 16 to thereby control the object detector 10.

Figure 3:
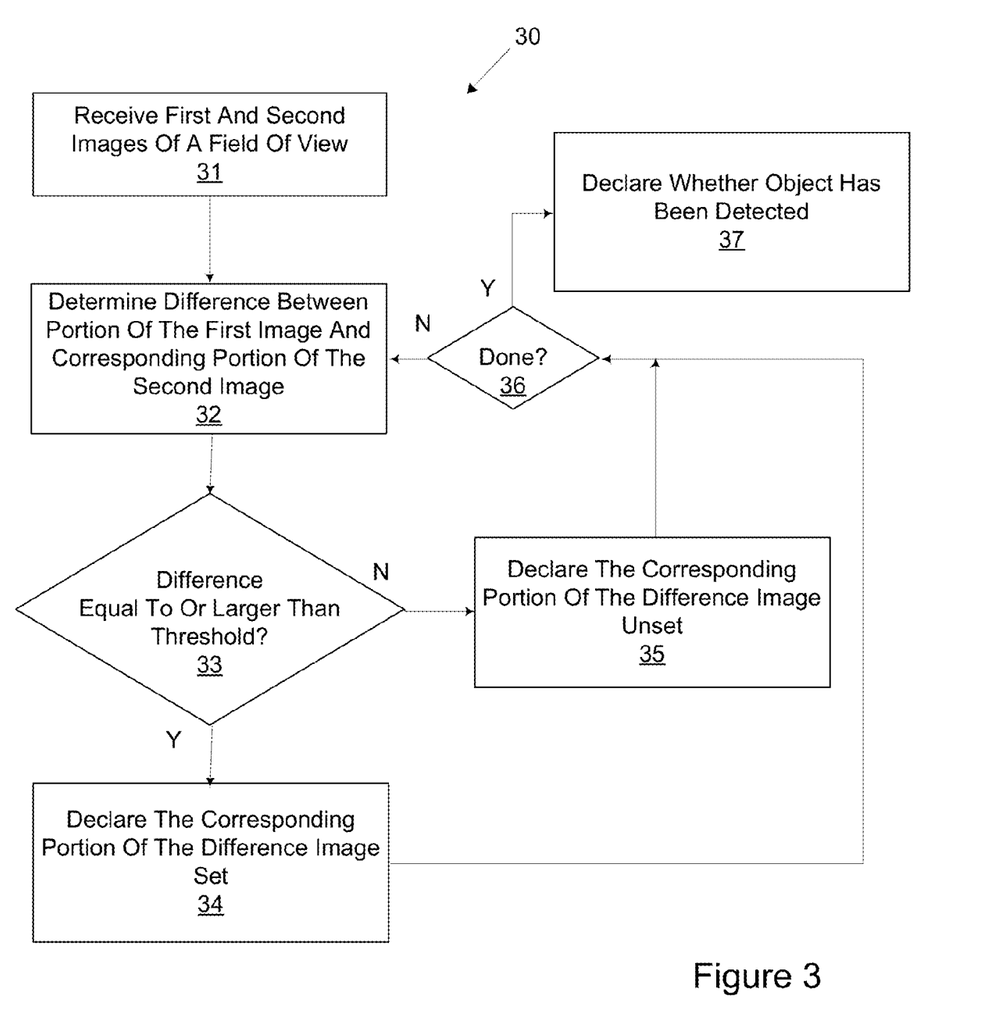
FIGS. 3 and 4 show flowcharts that illustrate exemplary logical operations to implement exemplary methods for object detection.
Figure 4:
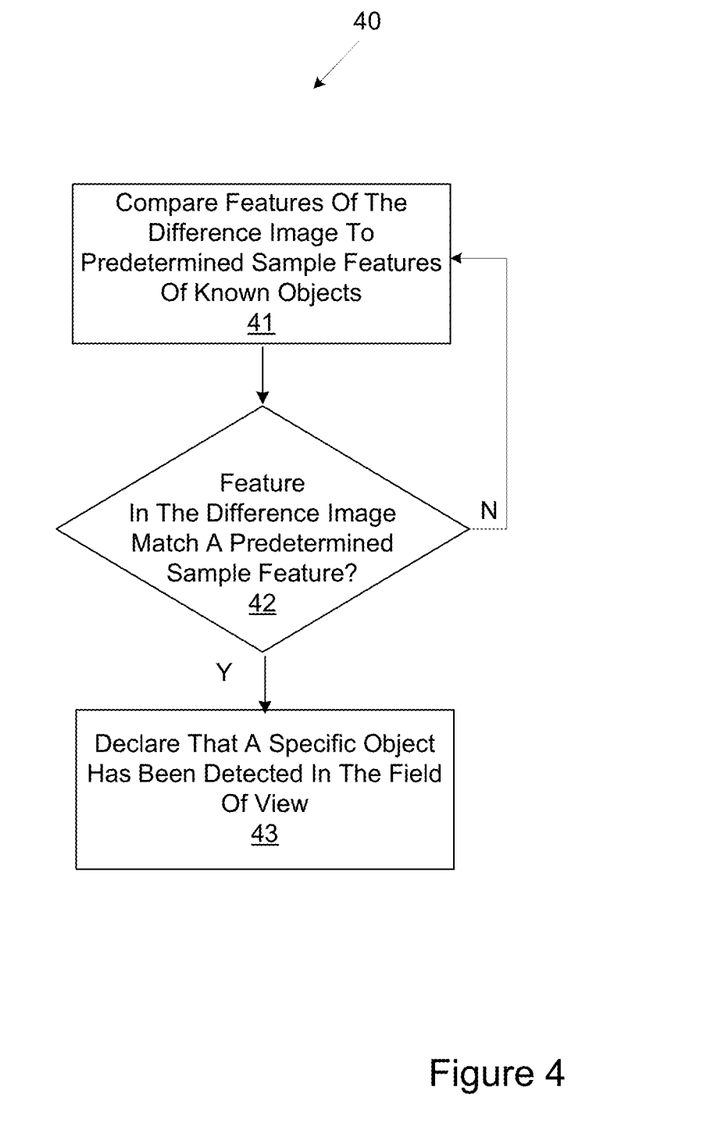

In accordance with the above features, FIGS. 3 and 4 show flowcharts that illustrate logical operations to implement exemplary methods for object detection. The exemplary methods may be carried out by executing embodiments of the object detectors, difference calculators, classifies, electronic devices, mobile telephones, etc. disclosed herein, for example. Thus, the flowcharts of FIGS. 3 and 4 may be thought of as depicting steps of a method carried out in the above-disclosed systems or devices by operation of hardware, software, or combinations thereof. Although FIGS. 3 and 4 show a specific order of executing functional logic blocks, the order of executing the blocks may be changed relative to the order shown. Also, two or more blocks shown in succession may be executed concurrently or with partial concurrence. Certain blocks also may be omitted.

In reference to FIG. 3 a method for object detection includes, at 31, receiving first and second images of a field of view. At 32, the method 30 further includes determining differences between portions of the first image and corresponding portions of the second image. In one embodiment, determining the differences includes performing a pixel by pixel comparison of pixels of the first image and corresponding pixels of the second image to determine differences between the pixels of the first image and the corresponding pixels of the second image.

At 33, if the difference between a portion of the first image and the corresponding portion of the second image is equal to or larger than a threshold, at 34, declare the corresponding portion of the difference image set (non-black). Back to 33, if the difference between the portion of the first image and the corresponding portion of the second image is not equal or larger than the threshold, at 35, declare the corresponding portion of the difference image not-set (non-black). In one embodiment, the process 34 or the process 35 is not included as, for example, if the difference between the portion of the first image and the corresponding portion of the second image is not equal or larger than the threshold, the method simply returns to evaluate (i.e., determine difference between) the subsequent portion of the images.

The process at 32 of determining differences between portions of the first image and corresponding portions of the second image and/or the processes at 34 and 35 of setting and unsetting the corresponding portion of the difference image may be conceptualized as generating a difference image whose portions correspond to the difference between the portions of the first image and the corresponding portions of the second image.

At 36, if the process of portion by portion determination of the differences between the first image and the second image is completed, at 37, declare, based on the difference between the portions of the first image and the corresponding portions of the second image whether a specific object has been detected in the field of view. In one embodiment, the declaration as to whether a specific object has been detected in the field of view takes place before the process of portion by portion determination of the differences between the first image and the second image is completed.

In reference to FIG. 4 a method 40 for object detection based on the difference between the portions of the first image and the corresponding portions of the second image includes, at 41, comparing features in the difference image to predetermined sample features of objects. At 42, if one or more features in the difference image match a predetermined sample feature, at 43, declare that a specific object has been detected in the field of view.

In one embodiment, declaring that a specific object has been detected in the field of view includes performing an optical character recognition (OCR) of the difference image to recognize a pattern in the difference image corresponding to the specific object.

In one embodiment, where a relatively large difference between the portions of the first image and the corresponding portions of the second image exists, the method 40 may declare that movement has been detected. In one embodiment, declaring based on the relatively large difference between the portions of the first image and the corresponding portions of the second image that movement of has been detected includes comparing features in the difference image to predetermined sample features to identify features in the difference image corresponding to specific movements or gestures.

Figure 5:
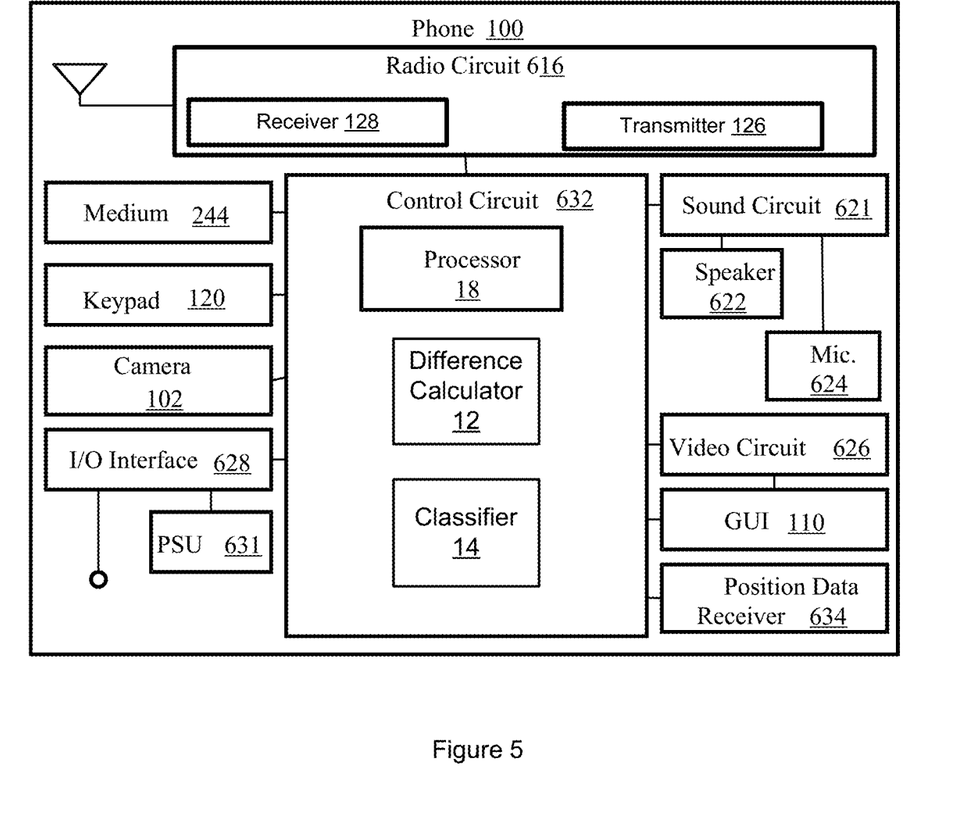
FIG. 5 illustrates a detailed block diagram of an exemplary mobile phone.

FIG. 5 illustrates a detailed block diagram of an exemplary mobile phone 100.

The phone 100 includes a control circuit 632 that is responsible for overall operation of the phone 100. For this purpose, the control circuit 632 includes the processor 18 that executes various applications, including applications related to or that form part of the phone 100 functioning as a telephone in a network and/or as an image capturing device.

In one embodiment, functionality of the phone 100 to perform according to the systems and methods described above in reference to FIGS. 1-4 are embodied in the form of executable logic (e.g., lines of code, software, or a program) that is stored in the non-transitory computer readable medium 244 (e.g., a memory, a hard drive, etc.) of the phone 100 and is executed by the control circuit 632. The operations described herein may also be thought of as a method that is carried out by the phone 100. Variations to the illustrated and described techniques are possible and, therefore, the disclosed embodiments should not be considered the only manner of carrying out phone 100 functions.

The phone 100 further includes the GUI 110 and a video circuit 626, which may be coupled to the control circuit 632. The video circuit 626 may include any appropriate buffers, decoders, video data processors and so forth.

The phone 100 further includes communications circuitry that enables the phone 100 to establish communication connections such as a telephone call. In the exemplary embodiment, the communications circuitry includes a radio circuit 616. The radio circuit 616 includes one or more radio frequency transceivers including the receiver 128, the transmitter 126 and an antenna assembly (or assemblies). Since the phone 100 is capable of communicating using more than one standard or radio access technology (RAT), the radio circuit 616 including the receiver 128 and the transmitter 126 represents each radio transceiver and antenna needed for the various supported connection types. The radio circuit 616 including the receiver 128 and the transmitter 126 further represents any radio transceivers and antennas used for local wireless communications directly with an electronic device, such as over a Bluetooth interface.

As indicated, the phone 100 includes the primary control circuit 632 that is configured to carry out overall control of the functions and operations of the phone 100. The processor 18 of the control circuit 632 may be a central processing unit (CPU), microcontroller or microprocessor. The processor 18 executes code stored in a memory (not shown) within the control circuit 632 and/or in a separate memory, such as the machine-readable storage medium 244, in order to carry out operation of the phone 100.

The machine-readable storage medium 244 may be, for example, one or more of a buffer, a flash memory, a hard drive, a removable media, a volatile memory, a non-volatile memory, a random access memory (RAM), or other suitable device. In a typical arrangement, the machine-readable storage medium 244 includes a non-volatile memory for long term data storage and a volatile memory that functions as system memory for the control circuit 632. The machine-readable storage medium 244 may exchange data with the control circuit 632 over a data bus. Accompanying control lines and an address bus between the machine-readable storage medium 244 and the control circuit 632 also may be present. The machine-readable storage medium 244 is considered a non-transitory computer readable medium. The data store 16 may be part of or separate from the medium 244.

The phone 100 may further include a sound circuit 621 for processing audio signals. Coupled to the sound circuit 621 are a speaker 622 and a microphone 624 that enable a user to listen and speak via the phone 100, and hear sounds generated in connection with other functions of the device 100. The sound circuit 621 may include any appropriate buffers, encoders, decoders, amplifiers and so forth.

The phone 100 may further include a keypad 120 that provides for a variety of user input operations. The phone 100 may further include one or more input/output (I/O) interface(s) 628. The I/O interface(s) 628 may be in the form of typical electronic device I/O interfaces and may include one or more electrical connectors for operatively connecting the phone 100 to another device (e.g., a computer) or an accessory (e.g., a personal handsfree (PHF) device) via a cable. Further, operating power may be received over the I/O interface(s) 628 and power to charge a battery of a power supply unit (PSU) 631 within the phone 100 may be received over the I/O interface(s) 628. The PSU 631 may supply power to operate the phone 100 in the absence of an external power source.

The phone 100 also may include various other components. For instance, the camera 102 may be present for taking digital pictures and/or movies. Image and/or video files corresponding to the pictures and/or movies may be stored in the machine-readable storage medium 244. The camera 102 may be configured to work in conjunction with the object detector 10 to obtain data representing images objects in a field of view of the camera 244 and producing signals including the data for the processor 18 and/or the object detector 10 of the above disclosed systems and methods to perform object detection.

As another example, a position data receiver 634, such as a global positioning system (GPS) receiver, may be present to assist in determining the location of the phone 100.

In the present disclosure, embodiments are described primarily in the context of a mobile telephone such as the mobile phone 100. However, the exemplary context of a mobile telephone is not the only operational environment in which aspects of the disclosed systems and methods may be used. Therefore, the techniques described in this disclosure may be applied to any type of appropriate electronic device, examples of which include a mobile telephone, a camera, a media player, a gaming device, a computer, a television, a tablet computer, etc.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. An image capturing device for detection of features of animal beings based on involuntary movement, the image capturing device comprising:
   a camera configured to obtain data representing a first image and a second image including a portion of an animal being in a field of view of the camera, wherein the first image and the second image are such that the animal being has not voluntarily moved between the obtaining of the first image and the obtaining of the second image; and
   an object detector including:
      a difference calculator configured to receive the data representing the first image and the second image and determine a difference between portions of the first image and corresponding portions of the second image even though the first image and the second image are such that the animal being did not voluntarily moved between the obtaining of the first image and the obtaining of the second image, the difference determined as larger than zero at least in part because of the involuntary movement, and
      a classifier configured to declare, based on the difference between the portions of the first image and the corresponding portions of the second image, that a specific feature of the animal being has been detected in the field of view of the camera.

2. The image capturing device of claim 1, wherein
the difference calculator is configured to generate a difference image by performing a portion to portion comparison of the portions of the first image and the corresponding portions of the second image,
the difference image includes portions corresponding to the difference between the portions of the first image and the corresponding portions of the second image as determined by the comparison of the portions of the first image and the corresponding portions of the second image, and
the portions of the difference image are binarily set or unset based on a comparison of the difference between the portions of the first image and the corresponding portions of the second image and a threshold.

3. The image capturing device of claim 1, wherein the difference calculator is configured to perform a pixel by pixel comparison of pixels of the first image and corresponding pixels of the second image to determine difference between the pixels of the first image and the corresponding pixels of the second image.

4. The image capturing device of claim 3, wherein the difference calculator is configured to generate a difference image whose pixels correspond to the difference between the pixels of the first image and the corresponding pixels of the second image.

5. The image capturing device of claim 4, wherein the difference calculator is configured to binarily declare pixels of the difference image set or unset based on a comparison of the difference between the pixels of the first image and the corresponding pixels of the second image and a threshold.

6. The image capturing device of claim 4, comprising:
a data store including data corresponding to sample features of animal beings including the specific feature,
wherein the classifier is configured to compare features in the difference image to the sample features to declare that the specific feature has been detected in the field of view of the camera.

7. The image capturing device of claim 4, wherein the classifier is configured to perform an optical character recognition (OCR) of the difference image to recognize a pattern in the difference image corresponding to the specific feature.

8. A method for detection of features of animal beings based on involuntary movement, the method comprising:
receiving a first image including a portion of an animal being in a field of view;
receiving a second image including the portion of the animal being in the field of view, wherein the first image and the second image are such that the animal being did not voluntarily moved between the first image and the second image as captured;
determining difference between portions of the first image and corresponding portions of the second image even though the first image and the second image are such that the animal being did not voluntarily moved between the obtaining of the first image and the obtaining of the second image, the difference determined as larger than zero at least in part because of the involuntary movement; and
declaring based on the difference between the portions of the first image and the corresponding portions of the second image that a specific feature of the animal being has been detected in the field of view.

9. The method of claim 8, wherein the determining the difference between the portions of the first image and the corresponding portions of the second image includes:
performing a pixel by pixel comparison of pixels of the first image and corresponding pixels of the second image to determine difference between the pixels of the first image and the corresponding pixels of the second image.

10. The method of claim 9, wherein the determining the difference between the portions of the first image and the corresponding portions of the second image includes:
generating a difference image whose pixels correspond to the difference between the pixels of the first image and the corresponding pixels of the second image.

11. The method of claim 10, wherein the determining the difference between the portions of the first image and the corresponding portions of the second image includes:
binarily declaring pixels of the difference image set or unset based on a comparison of the difference between the pixels of the first image and the corresponding pixels of the second image and a threshold.

12. The method of claim 10, wherein the declaring based on the difference between the portions of the first image and the corresponding portions of the second image that the specific feature of the animal being has been detected includes:
comparing features in the difference image to predetermined sample features of animal beings.

13. The method of claim 10, wherein the declaring based on the difference between the portions of the first image and the corresponding portions of the second image that the specific feature of the animal being has been detected includes:
performing an optical character recognition (OCR) of the difference image to recognize a pattern in the difference image corresponding to the specific feature of the animal being.

14. The method of claim 8, wherein the determining the difference between the portions of the first image and the corresponding portions of the second image includes:
generating a difference image by performing a portion to portion comparison of the portions of the first image and the corresponding portions of the second image, wherein the difference image includes portions corresponding to the difference between the portions of the first image and the corresponding portions of the second image as determined by the comparison of the portions of the first image and the corresponding portions of the second image, and wherein the portions of the difference image are binarily set or unset based on a comparison of the difference between the portions of the first image and the corresponding portions of the second image and a threshold.

15. An object detector for detection of features of animal beings based on involuntary movement, comprising:
a processor;
a data store operatively connected to the processor and including data representing a first image and a second image including a portion of an animal being in a field of view, wherein the first image and the second image are such that the animal being did not voluntarily moved between the first image and the second image as captured;
a difference calculator configured to receive the data representing the first image and the second image and determine difference between portions of the first image and corresponding portions of the second image even though the first image and the second image reflect that the animal being did not voluntarily moved between the obtaining of the first image and the obtaining of the second image, the difference determined as larger than zero at least in part because of the involuntary movement; and a classifier configured to declare, based on the difference between the portions of the first image and the corresponding portions of the second image, that a specific feature of the animal being has been detected in the field of view.

16. The object detector of claim 15, wherein
the difference calculator is configured to generate a difference image by performing a portion to portion comparison of the portions of the first image and the corresponding portions of the second image, the difference image includes portions corresponding to the difference between the portions of the first image and the corresponding portions of the second image as determined by the comparison of the portions of the first image and the corresponding portions of the second image, and the portions of the difference image are binarily set or unset based on a comparison of the difference between the portions of the first image and the corresponding portions of the second image and a threshold.

17. The object detector of claim 15, wherein
the difference calculator is configured to:
perform a pixel by pixel comparison of pixels of the first image and corresponding pixels of the second image to determine difference between the pixels of the first image and the corresponding pixels of the second image, and binarily declaring pixels of a difference image set or unset based on a comparison of the difference between the pixels of the first image and the corresponding pixels of the second image and a threshold, and the classifier is configured to:
compare features in the difference image to predetermined sample features to declare that the specific feature of the animal being has been detected in the field of view.

* * * * *